United States Patent [19]

Lennen

[11] Patent Number: 5,708,439
[45] Date of Patent: Jan. 13, 1998

[54] METHOD AND APPARATUS FOR OBSERVING UNKNOWN CODES ON SATELLITE POSITIONING SYSTEM

[75] Inventor: Gary R. Lennen, San Jose, Calif.

[73] Assignee: Trimble Navigation Limited, Sunnyvale, Calif.

[21] Appl. No.: 544,996

[22] Filed: Oct. 30, 1995

[51] Int. Cl.$^6$ ........................................... G01S 5/02
[52] U.S. Cl. ............................. 342/357; 342/352
[58] Field of Search ........................ 342/357, 352, 342/81, 354

[56] References Cited

U.S. PATENT DOCUMENTS

| | | |
|---|---|---|
| 4,112,372 | 9/1978 | Holmes et al. ............... 325/321 |
| 4,463,357 | 7/1984 | MacDoran . |
| 4,667,203 | 5/1987 | Counselman, III . |
| 4,972,431 | 11/1990 | Keegan . |
| 5,293,170 | 3/1994 | Lorenz et al. . |
| 5,541,606 | 7/1996 | Lennen ........................ 342/357 |

Primary Examiner—Thomas H. Tarcza
Assistant Examiner—Dao L. Phan
Attorney, Agent, or Firm—Boris G. Tankhilevich

[57] ABSTRACT

The method and apparatus for observing unknown codes on the Satellite Positioning System satellites are disclosed. The technique employs the parabolic high gain antenna to determine the energy spectrum of the unknown W code. The technique does not provide sufficient accuracy to implement the effective anti-spoofing device.

18 Claims, 11 Drawing Sheets

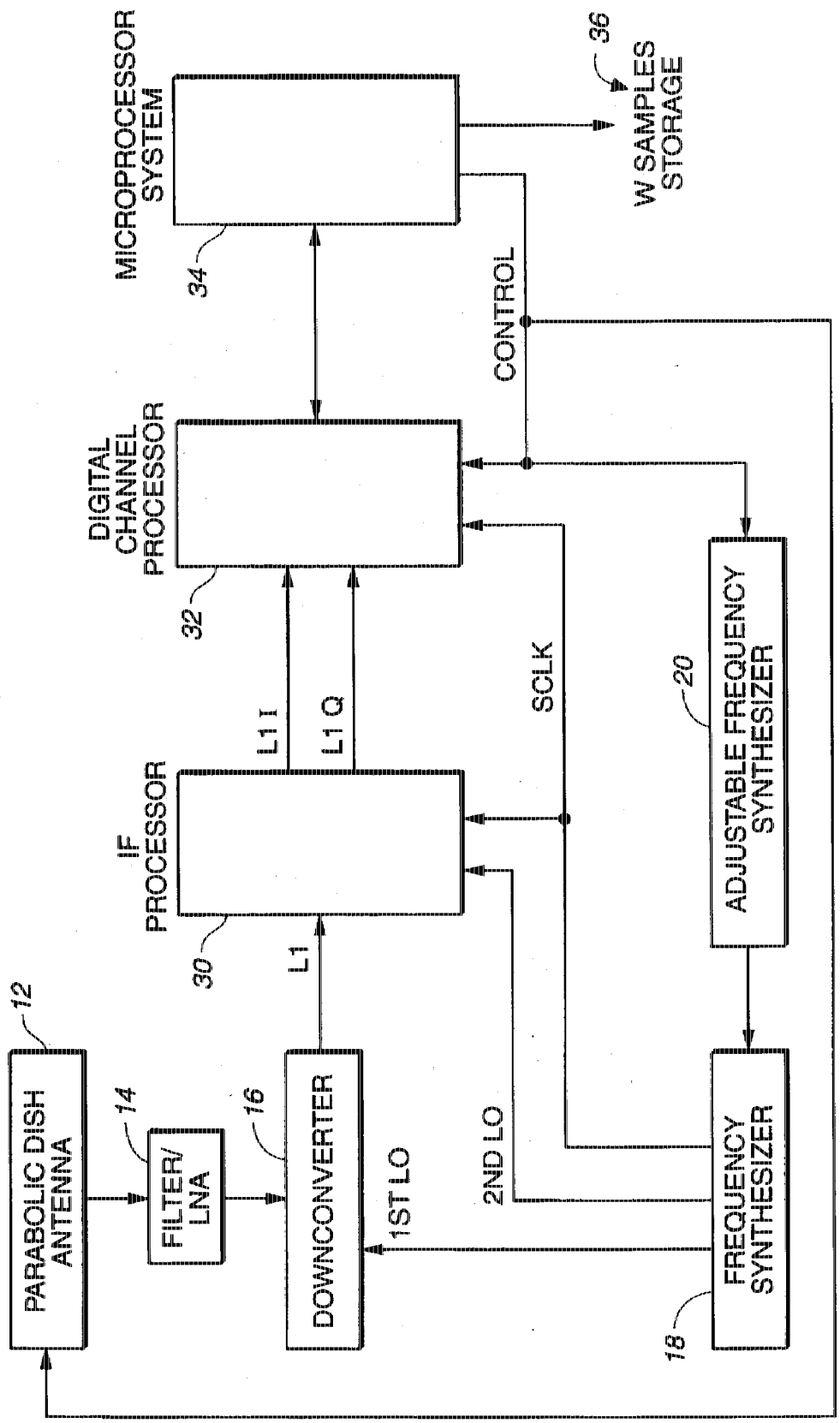
FIG._1

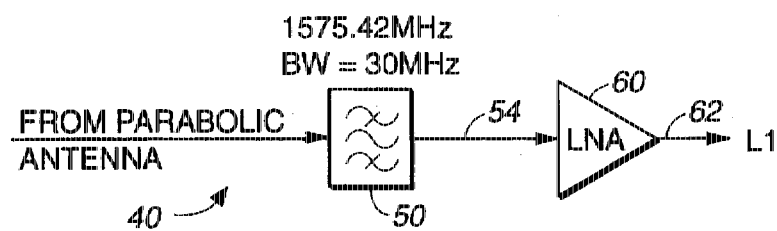
FIG._2
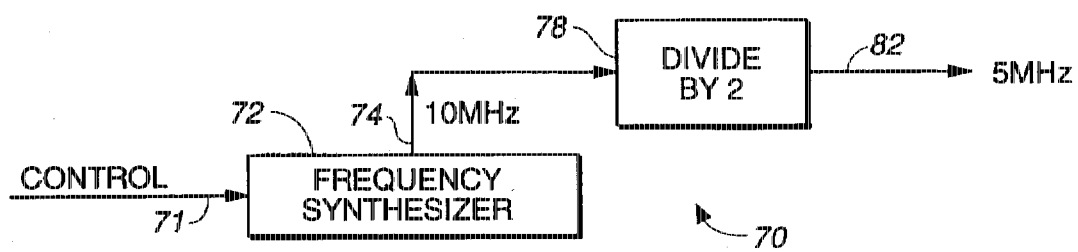
FIG._3
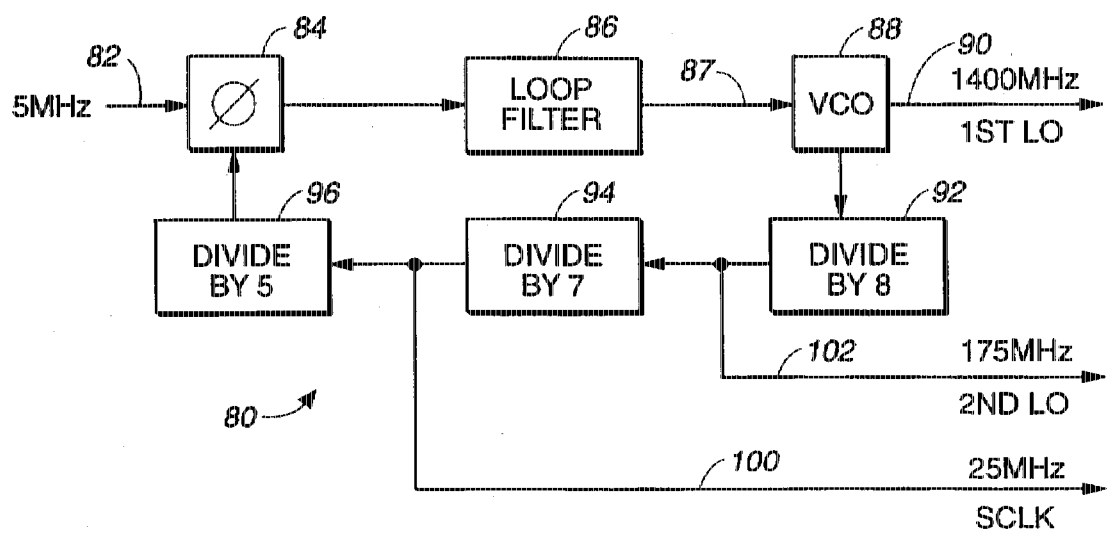
FIG._4

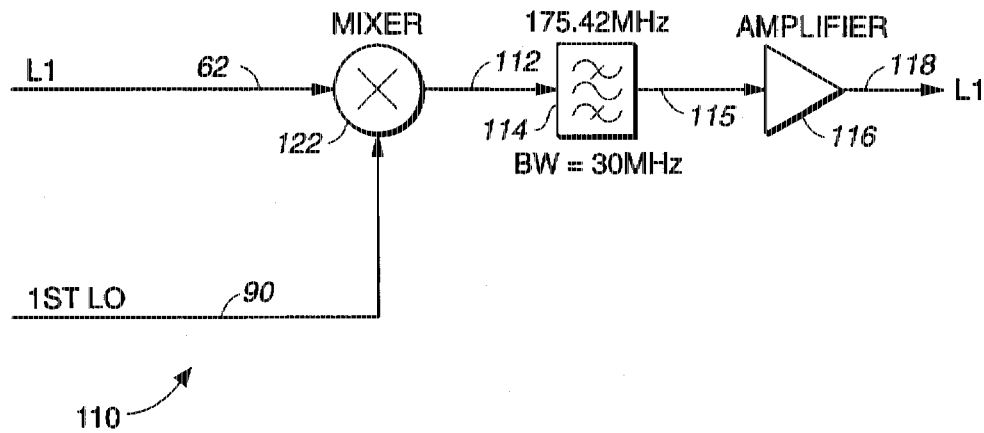
FIG._5
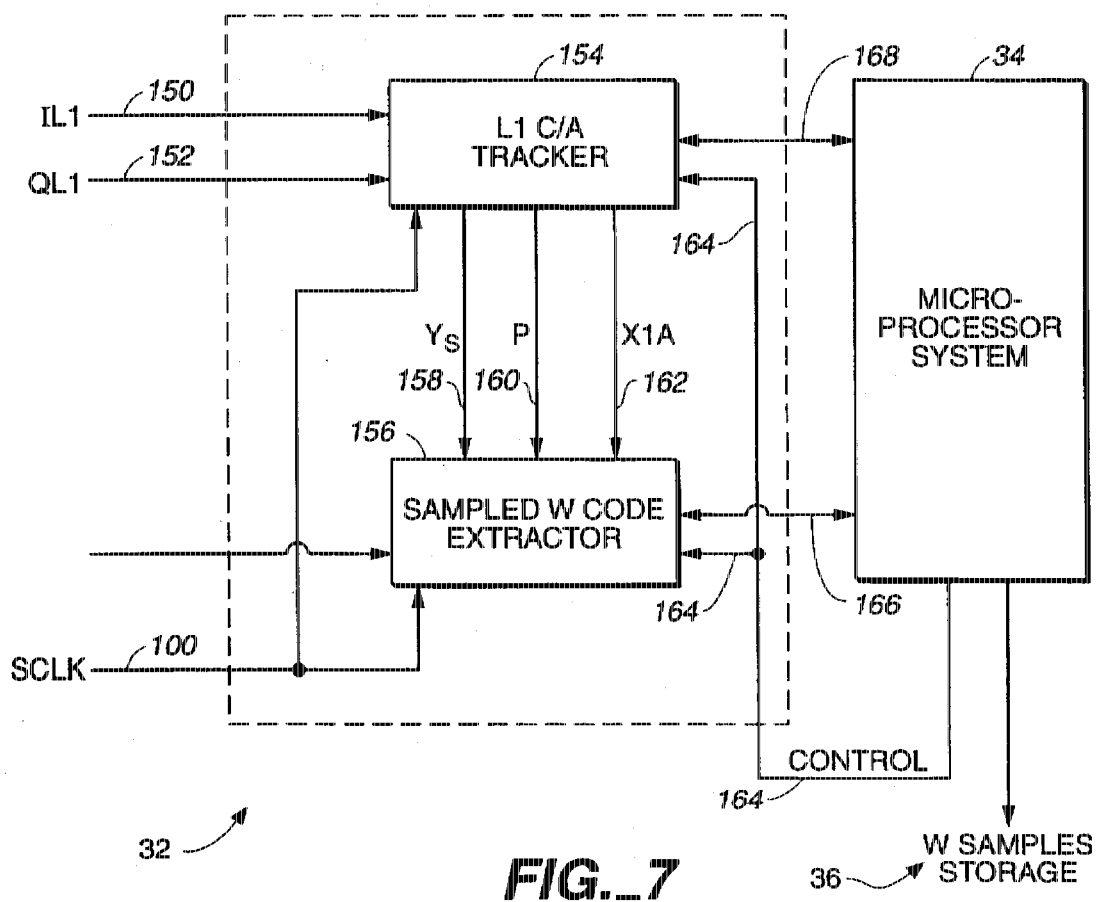
FIG._7

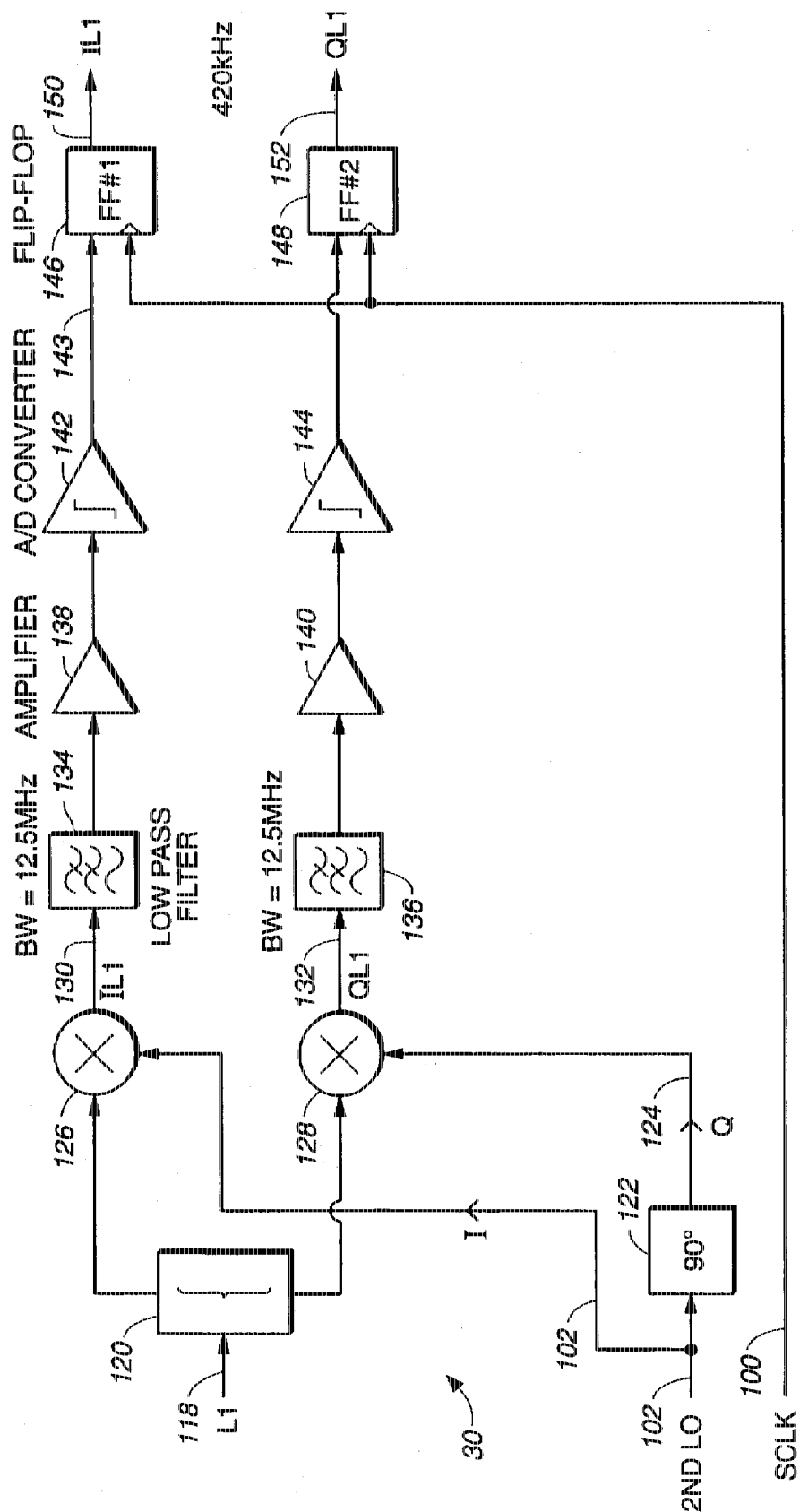
FIG._6

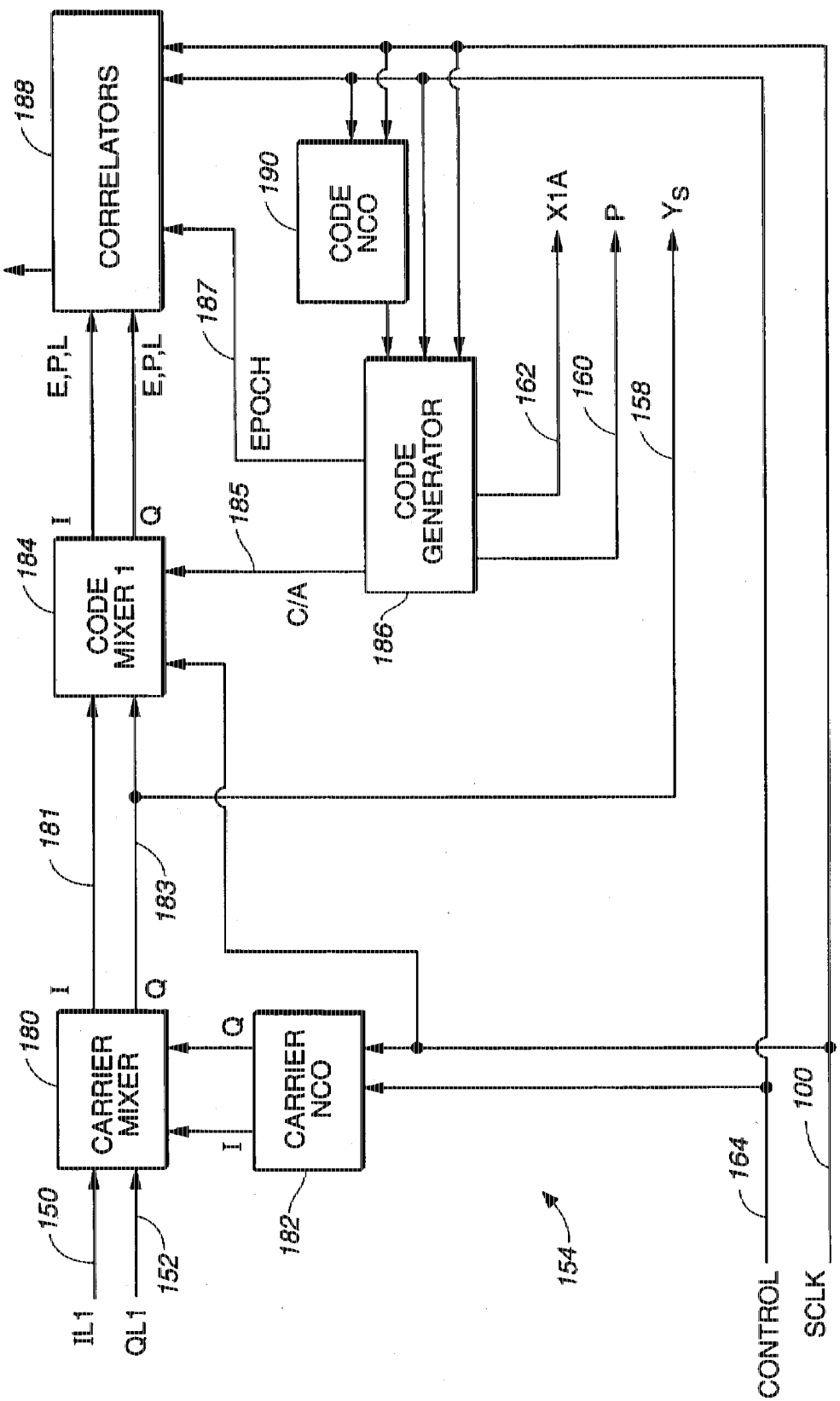
FIG._8

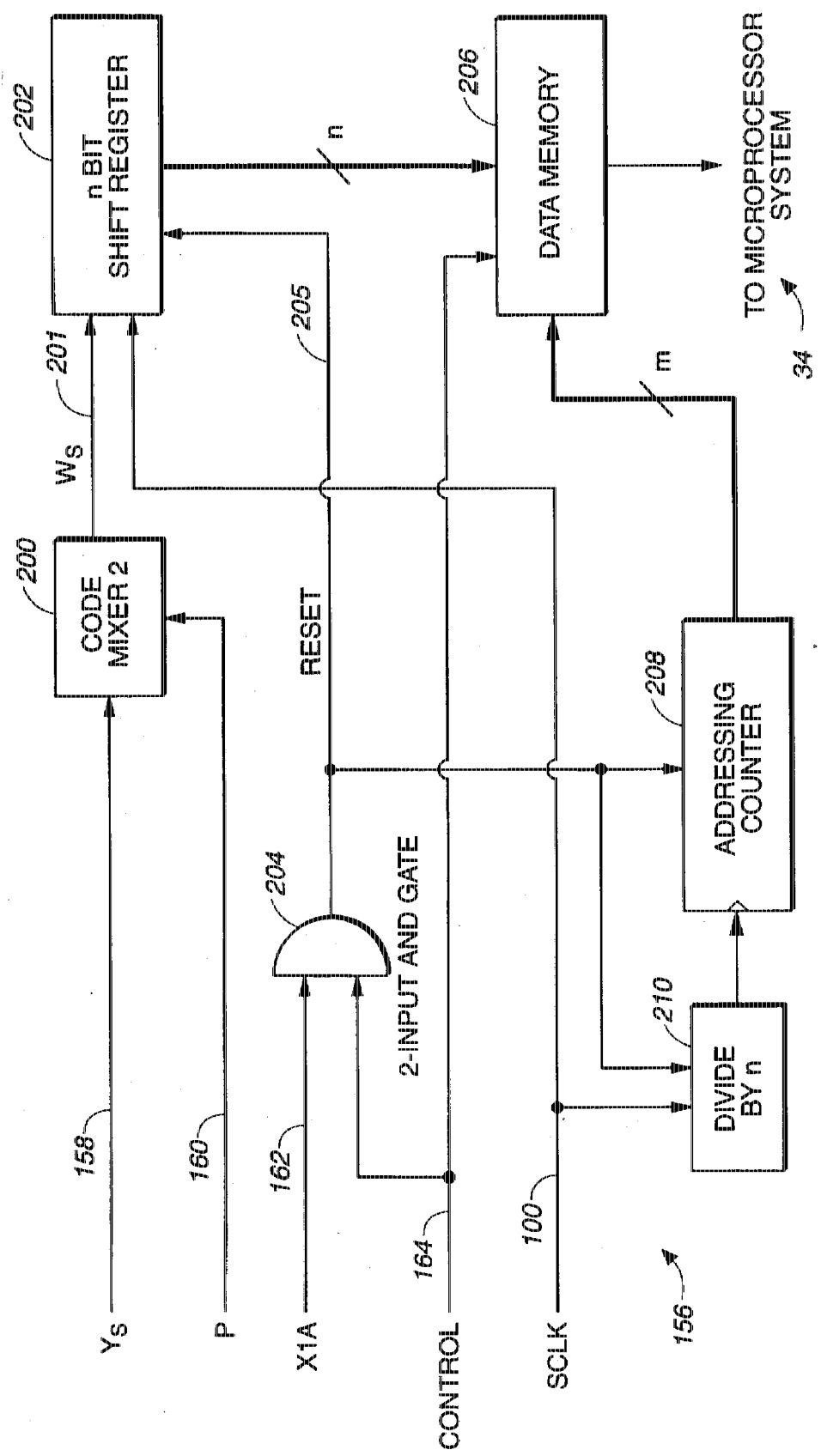
FIG._9

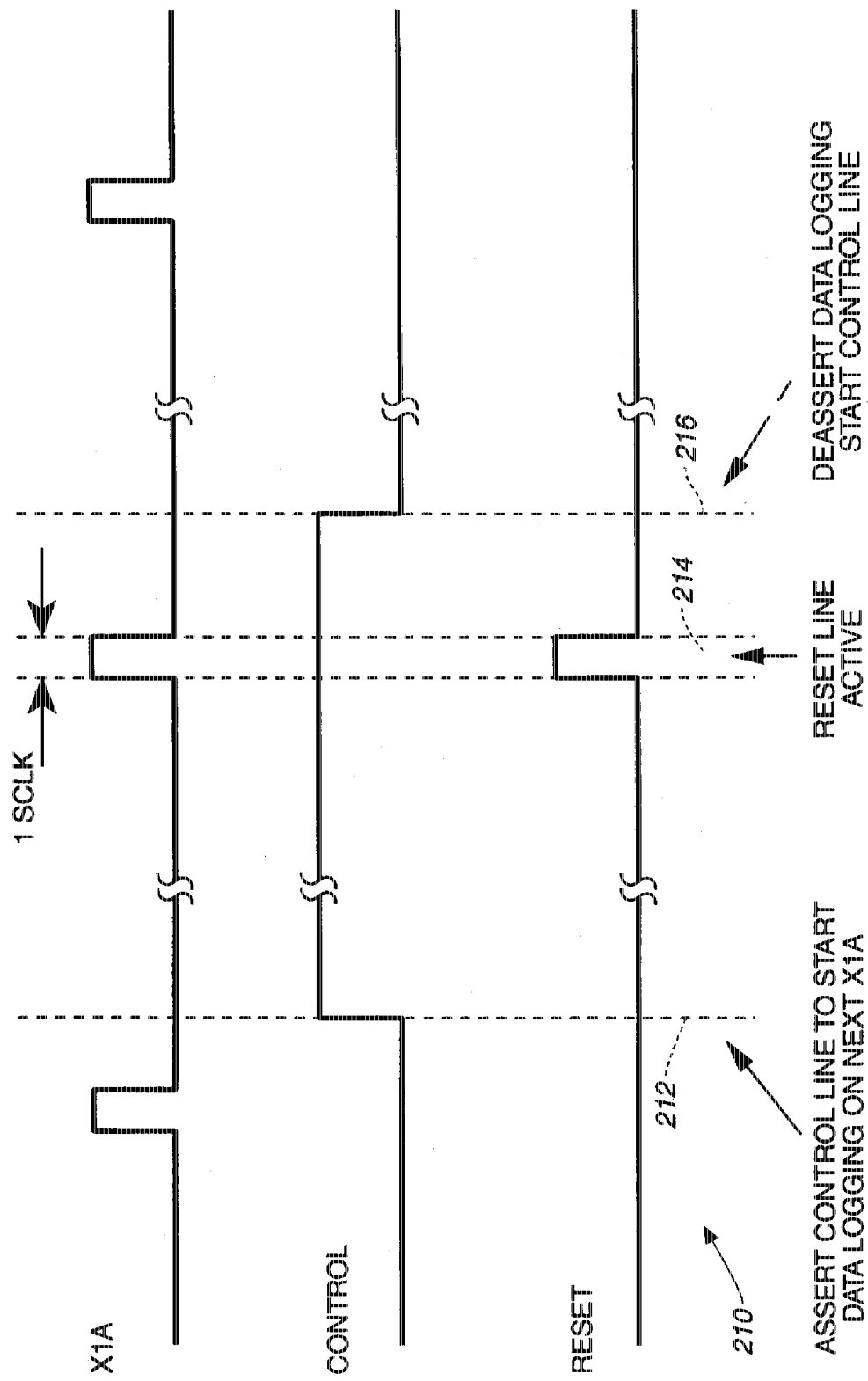

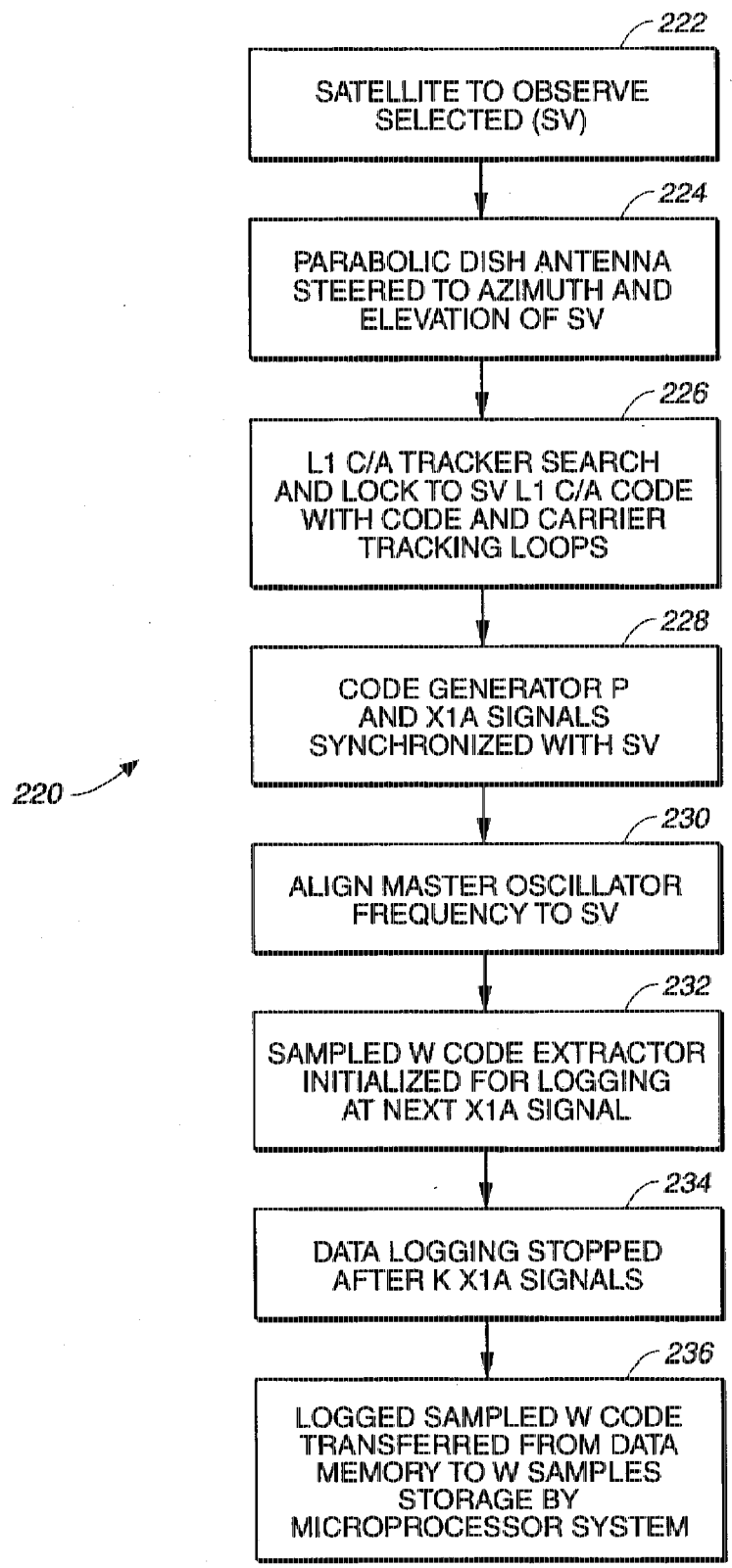
FIG._11

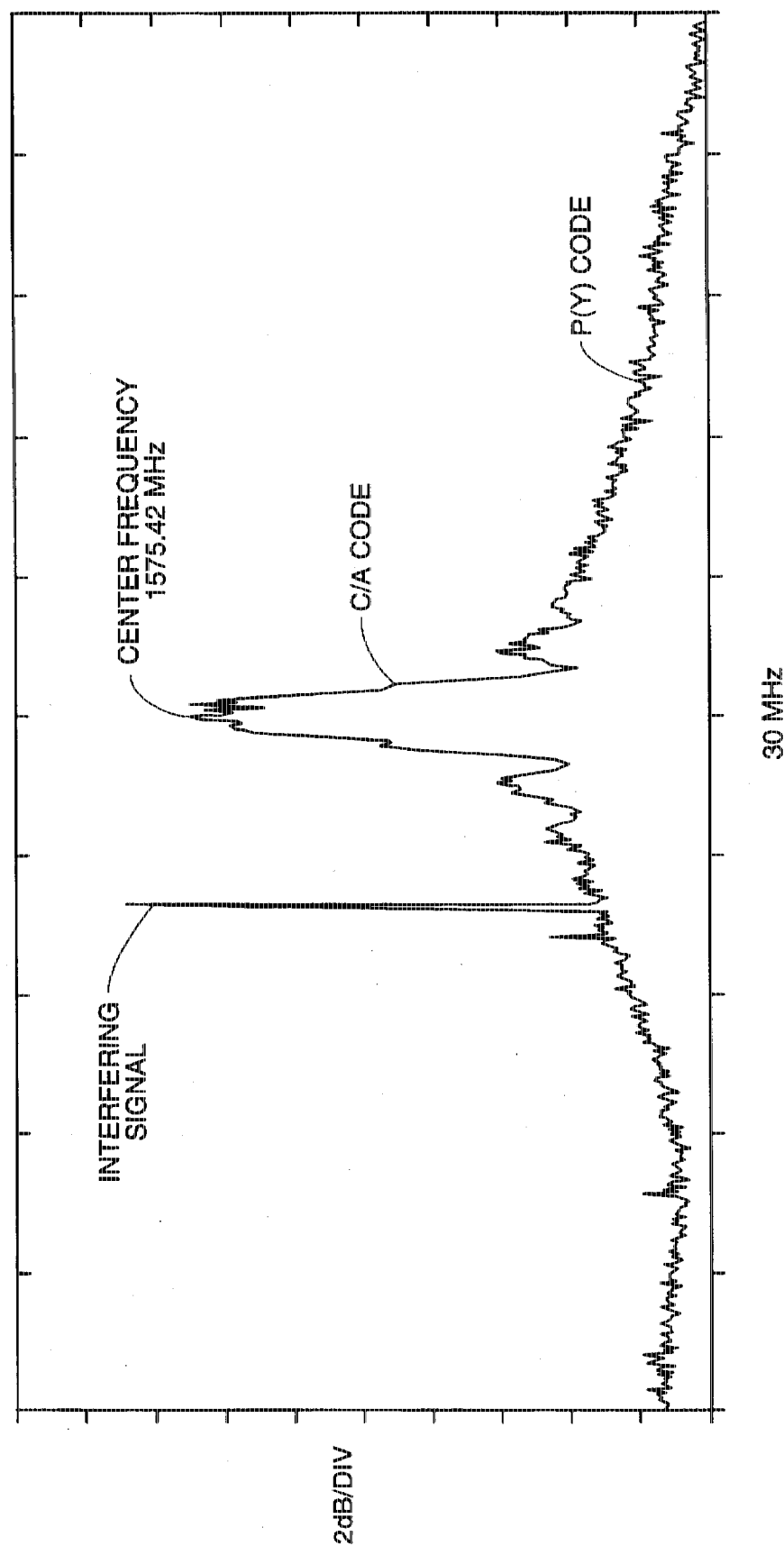
FIG._12

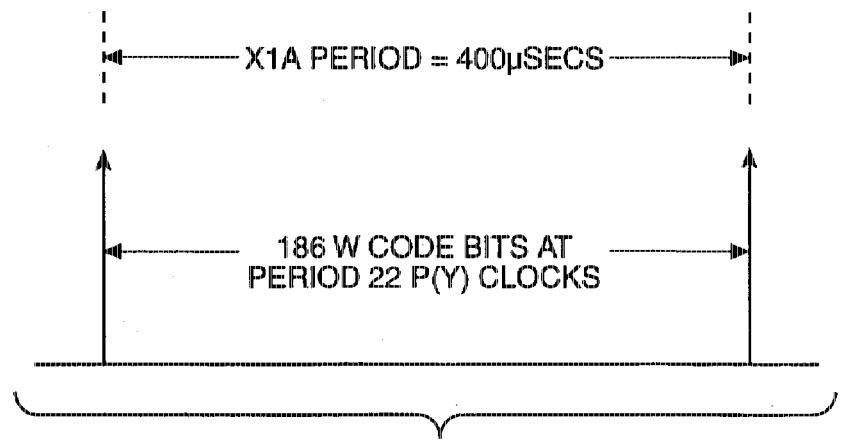
FIG._14
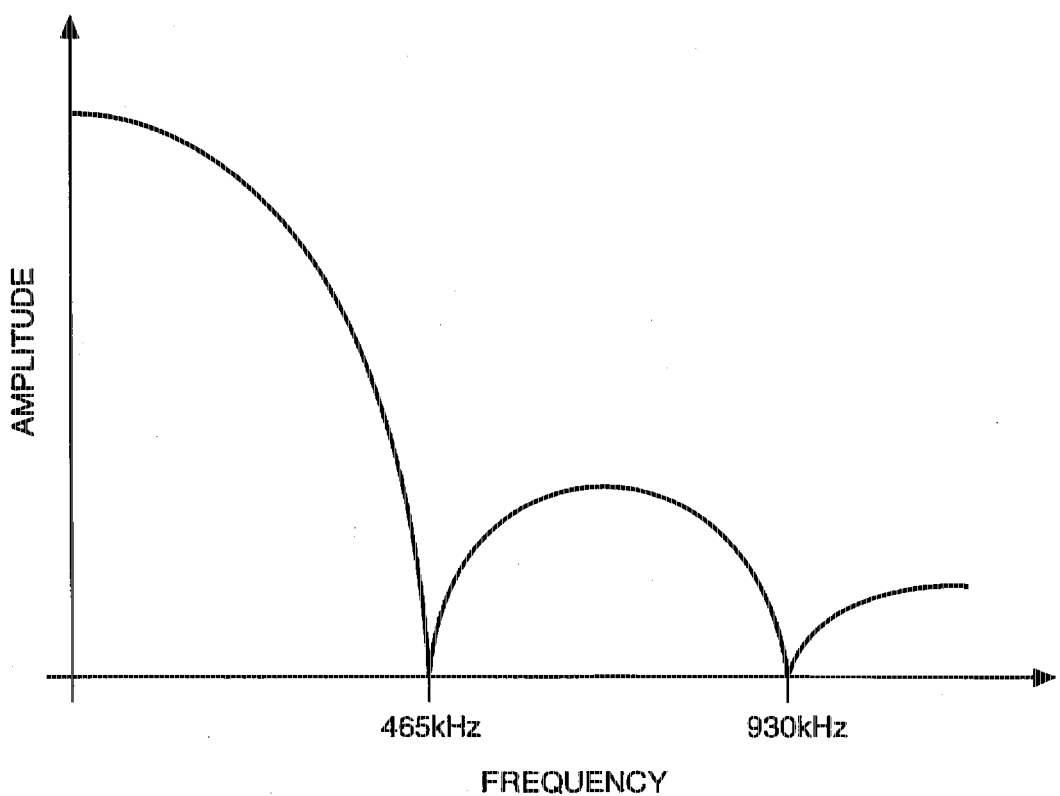
FIG._15

METHOD AND APPARATUS FOR OBSERVING UNKNOWN CODES ON SATELLITE POSITIONING SYSTEM

BACKGROUND

The invention relates to a Satellite Positioning System (SPS) receiver capable of observing, receiving, and analyzing satellite signals which have been encrypted with an unknown security code. The SPS includes different satellite systems. One of those systems is a global positioning system (GPS).

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1=1575.42$ MHz and an L2 signal having a frequency $f2=1227.6$ MHz. These two frequencies are integral multiples $f1=1540\ f0$ and $f2=1200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency $f$ (delay $\sim f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies L1 and L2 from the spacecraft to the receiver using a cross correlator. A variable delay is adjusted relative to a fixed delay in the respective channels L1 and L2 to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of $10\ f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7,000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemerides of the transmitting GPS satellite (which includes complete information about the transmitting satellite within the next several hours of transmission) and an almanac for all GPS satellites (which includes less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System*, Tom Logsdon, Van Nostrand Reinhold, N.Y., 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k\ (=1, 2, \ldots 24)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites transmit navigational data at a rate of 50 Baud for C/A code and 100 Baud for P code. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SPS), such as the Global Positioning System (GPS) or the Global Orbiting Navigation Satellite System (GLONASS), uses transmission of coded radio signals, with the structure described above, from a plurality of Earth-orbiting satellites. An SPS antenna receives SPS signals from a plurality (preferably four or more) of SPS satellites and passes these signals to an SPS signal receiver/processor, which (1) identifies the SPS satellite source for each SPS signal, (2) determines the time at which each identified SPS signal arrives at the antenna, and (3) determines the present location of the SPS satellites.

The range (Ri) between the location of the i-th SPS satellite and the SPS receiver is equal to the speed of light c times ($\Delta ti$), wherein ($\Delta ti$) is the time difference between the SPS receiver's clock and the time indicated by the satellite when it transmitted the relevant phase. However, the SPS receiver has an inexpensive quartz clock which is not synchronized with respect to the much more stable and precise atomic clocks carried on board the satellites. Consequently, the SPS receiver actually estimates not the true range Ri to the satellite but only the pseudo-range (ri) to each SPS satellite.

After the SPS receiver determines the coordinates of the i-th SPS satellite by picking up transmitted ephemerides constants, the SPS receiver can obtain the solution of the set of the four equations for its unknown coordinates (x0, y0, z0) and for unknown time bias error (cb). The SPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SPS receiver.

The C/A code modulated phase quadrature carrier component of the L1 signal is provided for commercial use.

To prevent jamming signals from being accepted as actual satellite signals, the satellites are provided with a secret Y-code, which replaces the known P-code when the "anti-spoofing" is ON. When the "anti-spoofing" is OFF, the Y-code is turned OFF, and the known P-code is used. Thus, the secret Y-code can be turned ON or OFF at will by the U.S. Government. The "anti-spoofing" allows the GPS system to be used for the military or other classified United States Government projects. Since the Y-code is classified, the commercial GPS users employ different techniques to recover some of the characteristics of the Y-code.

One such technique is proposed by Counselman III in U.S. Pat. No. 4,667,203, wherein the incoming signal is divided into upper and lower sidebands, which are multiplied together to obtain the second harmonic of the carrier signal. However, the degradation of the signal-to-noise ratio (SNR) is the same as with squaring the entire signal.

U.S. Pat. No. 4,972,431 issued to Keegan, discloses a different approach to the recovering of the unknown Y-code. The incoming encrypted P-code GPS signal is not immediately squared. Instead, after mixing with a local oscillator signal to lower its frequency to an intermediate frequency, the encrypted Y-code signal is correlated with a locally generated P-code signal. Since the locally generated P-code signal does not perfectly match the encrypted Y-code sequence, the correlation does not produce a sharp peak in the frequency spectrum. The result of the correlation is filtered by a bandpass filter, and the reduced-bandwidth signal is squared. Because the squaring step is performed over a narrower bandwidth than the original P-code, there is less degradation in the SNR of the received signal, as compared with squaring over the entire P-code bandwidth. The performance is more reliable under weak signal conditions because the cycle ambiguity of the carrier signal can be resolved more rapidly. The invention does not frustrate the intended purpose of P-code encryption.

However, the techniques described in the Keegan and Counselman patents result in a half wavelength L2 carrier phase observable, making it more difficult to quickly resolve carrier integer ambiguities.

In U.S. Pat. No 5,293,170 issued to Lorenz, the modulated code period is estimated to be an integer multiple of P chips. The invention assumes the knowledge of the timing of the unknown Y-code. However, such Y-code timing information is not available to the commercial user and cannot be recovered without knowledge of the classified Y-code information.

What is needed is a SPS receiver capable of observing the GPS satellites and discovering general Y- code structure information which is always present on every satellite observed and subsequently optimizing the SPS receiver design to these characteristics.

SUMMARY

The present invention is unique because it discloses a method and apparatus for observing the Y-code. This allows to recover some of the important characteristics of the Y-code that can be subsequently used for purposes of optimizing the GPS receiver design.

One aspect of the present invention is directed to an apparatus for observing unknown codes on Satellite Positioning System. The apparatus comprises: (a) a RECEIVING MEANS for receiving a known C/A code modulated on L1 carrier frequency, and for receiving an unknown Y code modulated on L1 carrier frequency signal, wherein the received L1 signal contains propagation noise, and wherein the unknown Y-code comprises the known P-code and the unknown W-code; (b) a MICROPROCESSOR SYSTEM for controlling the apparatus using a CONTROL signal; (c) a W SAMPLES STORAGE for permanently storing the logged W code samples; and (d) at least one DIGITAL CHANNEL PROCESSING MEANS.

The disclosed apparatus performs the following operations: (1) locally generates a replica of the C/A code modulated on L1 carrier frequency signal; (2) locally generates a replica of the P code modulated on L1 carrier frequency signal, wherein the locally generated replica of L1 signal does not contain propagation noise; (3) extracts an estimate of the Y code from the L1 signal, wherein the estimate signal contains propagation noise; (4) correlates a locally generated replica of C/A code with the received L1 code for obtaining the code and carrier lock to the L1 C/A code signal; (5) removes the P code from the locally extracted estimate of the L1 Y code to obtain a locally extracted estimate of the L1 W code; (6) performs logging of the L1 W-code estimates in a DATA MEMORY, at a time mark controlled by the MICROPROCESSOR; and (7) transfers data logged in the DATA MEMORY to a W SAMPLES STORAGE for further analysis.

The RECEIVING MEANS further includes: a PARABOLIC DISH ANTENNA MEANS for receiving the L1 satellite signal; a FILTER/LNA MEANS for performing filtering and low noise amplification of the L1 signal, wherein the FILTER/LNA determines the signal/noise ratio of the received L1 signal; a DOWNCONVERTER MEANS for mixing and converting the L1 signal; an IF PROCESSOR MEANS for transforming the converted L1 signal into digitally sampled quadrature versions (IL1, QL1) of L1 signal; and an ADJUSTABLE FREQUENCY SYNTHESIZER MEANS; wherein the ADJUSTABLE FREQUENCY SYNTHESIZER MEANS generates several timing signals.

The DIGITAL CHANNEL PROCESSING MEANS further comprises: (a) an L1 C/A TRACKER MEANS for tracking L1 C/A code; (b) a SAMPLED W CODE EXTRACTOR for extracting and storing samples of the unknown W code from a single satellite; and (c) a MICROPROCESSOR MEANS system.

The L1 C/A TRACKER MEANS includes: a carrier numerically controlled oscillator (CARRIER NCO MEANS); a CARRIER MIXER MEANS for multiplying outputted by the IF PROCESSOR MEANS digitized inphase IL1 and QL1 signals having carrier frequency with outputted by the CARRIER NCO MEANS inphase and quadrature components of digital carrier; wherein the CARRIER MIXER MEANS outputs inphase IL1 and quadrature Q L1 signals having zero carrier frequency; and a CODE MIXER 1 MEANS for code correlating the CARRIER MIXER MEANS output signals with a locally generated replica of C/A code. When the L1 TRACKER MEANS's carrier tracking loop is closed via the CARRIER NCO MEANS, the CARRIER MIXER's input to the CODE MIXER 1 MEANS represents the satellite signal L1 C/A code. The CODE MIXER 1 MEANS performs the code correlation at 3 time points (early, punctual and late) on the autocorrelation function graph creating an early, a punctual and a late sample of the autocorrelation function.

The L1 C/A TRACKER MEANS further includes a block CORRELATORS MEANS for integrating the early, punctual and late samples of the autocorrelation function over an integer number of EPOCH signals; wherein the CORRELATORS MEANS output signal is fed to the MICROPROCESSOR MEANS system at a rate of L1 C/A code EPOCH, and wherein the MICROPROCESSOR MEANS uses the CORRELATORS MEANS output signal to develop feedback signals for the L1 carrier tracking loop and for the L1 code tracking loop; a CODE GENERATOR MEANS for providing a locally generated replica of C/A code, a locally generated replica of P code, an EPOCH signal, and an X1A signal; and a code numerically controlled oscillator (CODE NCO MEANS) for driving the CODE GENERATOR MEANS.

When the L1 C/A TRACKER is carrier locked to the tracked satellite the satellite's C/A code power is observed in the I output of the CARRIER MIXER and the satellite's P(Y) code power is observed in the Q output of the CARRIER MIXER. The L1 C/A TRACKER's output signal Ys represents a baseband estimate of the Y code of the tracked satellite, and the X1A output of the CODE GENERATOR is a standard P code generator timing signal that refers to a particular state of the X1A register.

The SAMPLED W CODE EXTRACTOR includes: (a) a CODE MIXER 2 MEANS for mixing P code with Ys code; (b) an n-BIT SHIFT REGISTER for maintaining the last n sampled bits of the Ws signal; (c) a DATA MEMORY block, wherein every n-th clock signal SCLK the output of the n-BIT SHIFT REGISTER is read into the DATA MEMORY; (d) an ADDRESSING COUNTER coupled to the DATA MEMORY block and addressing the DATA MEMORY block, wherein the ADDRESSING COUNTER increments the memory address value every n-th clock signal SCLK; (e) a 2-INPUT AND GATE gating the CONTROL and X1A signals for initiating the sample data collection process by the DATA MEMORY block at a known time in the GPS week, for synchronizing the logging process, and for allowing repeated controlled observation of the encrypted signals, wherein the 2-INPUT AND GATE generates a RESET signal; and (f) a DIVIDE BY n block for generating a second clock signal by dividing the clock SCLK signal by n, wherein the DIVIDE BY n block is reset by the RESET signal, and wherein the second clock signal clocks the ADDRESSING COUNTER. When the DATA MEMORY is filled with samples, the DATA MEMORY is read by the MICROPROCESSOR SYSTEM and transferred to the permanent storage W SAMPLES STORAGE.

One more aspect of the present invention is directed to a method for observing unknown codes on SPS. The method employs a system comprising a RECEIVING MEANS, at least one DIGITAL CHANNEL PROCESSING MEANS, and a W SAMPLES STORAGE.

The method comprises the steps of: (1) providing the RECEIVING MEANS, the W SAMPLES STORAGE, and at least one the DIGITAL CHANNEL PROCESSING MEANS; (2) receiving a known L1 C/A code modulated on L1 carrier frequency, and an unknown Y code modulated on L1 carrier frequency signal by the RECEIVING MEANS; wherein the received L1 signal contains propagation noise; and wherein the Y code comprises a known P code and an unknown W code; (3) generating a local replica of the C/A code and a local replica of the P code modulated on L1 carrier frequency signal by each DIGITAL CHANNEL PROCESSING MEANS; (4) extracting an estimate of the Y code from the L1 signal by each DIGITAL CHANNEL PROCESSING MEANS; (5) correlating a locally generated replica of C/A code with the received L1 code for obtaining code and carrier lock to the L1 C/A code signal; (6) removing the P code from the locally extracted estimate of the L1 Y code by each DIGITAL CHANNEL PROCESSOR to obtain a locally extracted estimate of the L1 W code; (7) logging the L1 W code estimate in a DATA MEMORY at a time mark controlled by a MICROPROCESSOR; and (8) transferring the logged sampled W code from the DATA MEMORY to the W SAMPLES STORAGE for further processing.

Yet one more aspect of the present invention is directed to a method for logging the sampled W code generated by the Satellite Positioning System (SPS) comprising the steps of: (1) selecting a satellite-vehicle (SV) to be observed; (2) observing the selected SV by steering a PARABOLIC DISH ANTENNA to azimuth and elevation of the SV; (3) searching by an L1 C/A TRACKER an L1 C/A code signal generated by the SV; (4) locking to the L1 C/A code by closing the code and carrier tracking loops by the L1 C/A TRACKER; (5) synchronizing P and X1A signals generated by a CODE GENERATOR with the SV satellite L1 C/A signal; (6) aligning an ADJUSTABLE FREQUENCY OSCILLATOR to the SV; (7) extracting the unknown W code signals from the L1 C/A signals by a W CODE EXTRACTOR; (8) logging the sampled W code signals by a DATA MEMORY block; (9) transferring the logged sampled W code from the DATA MEMORY to a W SAMPLE STORAGE by a MICROPROCESSOR system;

and (10) stopping the logging process when the W SAMPLE STORAGE is filled.

BRIEF DESCRIPTION OF THE DRAWINGS.

FIG. 1 illustrates a simplified block-diagram of the GPS RECEIVER including a RECEIVING MEANS, a DIGITAL CHANNEL PROCESSOR, a MICROPROCESSOR SYSTEM, and a W SAMPLES STORAGE.

FIG. 2 shows a FILTER/low noise amplifier (LNA) for filtering and amplifying L1 signal.

FIG. 3 depicts an ADJUSTABLE FREQUENCY SYNTHESIZER for generating a timing signal with a reference frequency 5 MHz.

FIG. 4 illustrates a FREQUENCY SYNTHESIZER for outputting a 1st LO1 (local oscillator) signal 1400 MHz, a 2nd LO2 signal 175 MHz, and a (sampling clock) SCLK signal 25 MHz.

FIG. 5 shows a DOWNCONVERTER for converting an L1 signal into a 175.42 MHz signal.

FIG. 6 is an illustration of an IF (intermediate frequency) PROCESSOR for generating digitized output samples IL1 and QL1 having carrier frequency 420 kHz.

FIG. 7 depicts a DIGITAL CHANNEL PROCESSOR including an L1 C/A TRACKER, a SAMPLED W CODE EXTRACTOR, a MICROPROCESSOR SYSTEM, and a W SAMPLES STORAGE.

FIG. 8 shows an L1 C/A TRACKER.

FIG. 9 illustrates a SAMPLED W CODE EXTRACTOR.

FIG. 10 depicts an initialization timing of a SAMPLED W CODE EXTRACTOR.

FIG. 11 is an illustration of sampled W code logging process.

FIG. 12 shows an L1 code spectrum observed with a PARABOLIC DISH ANTENNA.

FIG. 13 depicts sampled W code estimates.

FIG. 14 is an observed W code timing.

FIG. 15 is an observed W code frequency spectrum.

FULL DESCRIPTION OF THE PREFERRED EMBODIMENT.

FIG. 1 illustrates the experimental set up 10 to facilitate observation of the satellite encrypted codes. The signal L1 is first received through the steerable PARABOLIC DISH ANTENNA (12). Parabolic antennas are useful for applications requiring high gain. The parabolic dish antennas suitable for the purposes of the present invention are produced by the Information Processing Systems, Inc., based in Belmont, Calif. The important characteristics of the parabolic antennas employed by the present invention (for observation frequency L1=1575.42 MHz) are given as follows: (a) antenna diameter=1.8 meters; (b) antenna gain=27 dB; (c) antenna beamwidth=7°.

The ADJUSTABLE FREQUENCY SYNTHESIZER (20) provides the reference oscillator which drives all other clocks in the system. The FREQUENCY SYNTHESIZER 18 takes the output of the ADJUSTABLE FREQUENCY SYNTHESIZER 20 and generates important clock and local oscillator frequencies used throughout the system.

A FILTER/LNA 14 performs filtering and low noise amplification of the L1. The noise figure of the RECEIVER system is dictated by the performance of the FILTER/LNA combination. The DOWNCONVERTER 16 mixes the L1 signal in frequency down to approximately 175 MHz and outputs the analog L1 signal into an IF PROCESSOR 30. The IF PROCESSOR takes the analog L1 signal at approximately 175 MHz and converts it into the digitally sampled L1 inphase and quadrature signals at carrier frequencies 420 kHz.

At least one DIGITAL CHANNEL PROCESSOR 32 inputs the digitally sampled L1 inphase and quadrature signals. The DIGITAL CHANNEL PROCESSOR is designed to digitally track the observed L1 C/A code signal and to process the L1 Y code signal. The DIGITAL CHANNEL PROCESSOR performs these functions by tracking code and carrier signals. The MICROPROCESSOR SYSTEM (34) is a general purpose computing device that enables the closing of the code and carrier tracking loops, facilitates the logging of the sampled W code bits, and performs other functions.

FIG. 2 shows the detailed embodiment 40 of the FILTER/LNA. The L1 signal from the PARABOLIC ANTENNA 12 is bandpass filtered by the BANDPASS FILTER 50 with bandwidth BW=30 MHz. Filtered L1 signal 54 is fed into the low noise amplifier LNA 60. The noise figure of the LNA is 1.3 dB. The output signal 62 represents filtered and amplified L1 signal at 1575.42 MHz.

The ADJUSTABLE FREQUENCY SYNTHESIZER 70 is depicted in FIG. 3. This block consists of a FREQUENCY SYNTHESIZER (72) which output can be adjusted under the CONTROL signal 71 of the MICROPROCESSOR SYSTEM 34 of FIG. 1. In the preferred embodiment, the FREQUENCY SYNTHESIZER (72) outputs the 10 MHz (74) signal under the CONTROL signal 71 of the MICROPROCESSOR SYSTEM 34 of FIG. 1. The 5 MHz output signal 76 is obtained by dividing the 10 MHz signal by 2 in the DIVIDE BY 2 block 78.

FIG. 4 illustrates the FREQUENCY SYNTHESIZER 80 which takes as an input the 5 MHz signal 82 provided by the ADJUSTABLE FREQUENCY SYNTHESIZER and outputs a 1st LO1 signal 90, a 2nd LO2 signal 102, and a SCLK signal 100; wherein these timing signals are used by different blocks of the GPS RECEIVER.

The 5 MHz signal 82 is compared with the 5 MHz signal output from a block "DIVIDE BY 5" in a PHASE DETECTOR 84. The voltage output from the PHASE DETECTOR represents phase alignment of two 5 MHz signals and includes two signals, wherein the first of these signals has a large phase error and represents a large voltage output; and wherein the second of these signals has a small phase error and represents a small voltage output. A LOOP FILTER 86 filters out the high frequency voltage noise signal having a large phase error and outputs the low frequency noise signal 87 having a small phase error which is applied to a voltage controlled oscillator (VCO) 88. The low frequency noise signal 87 causes frequency change in the VCO output signal 90. When the loop is locked, the VCO output signal having a 1400 MHz frequency is used as the 1st LO1 (local oscillator) signal. By dividing the 1st LO1 signal by 8, a block 92 "DIVIDE BY 8" outputs the 2nd LO2 local oscillator signal 102 having 175 MHz. A block 94 "DIVIDE BY 7" divides the LO2 signal and outputs the sampling clock (SCLK) signal 100 having 25 MHz. A "DIVIDE BY 5" block 96 is used to close the LO1 loop.

The DOWNCONVERTER 110 is depicted in detail in FIG. 5 which decreases the frequency of the L1 signal outputted by the FILTER/LNA block. The L1 signal (L1=1575.42 MHz) is an output signal 62 from the FILTER/LNA shown in FIG. 2 The L1 signal is mixed by the 1st LO1 1400 MHz signal 90 (outputted by the FREQUENCY SYNTHE- SIZER in FIG. 4) in the MIXER 122. The L1 signal 62 after mixing becomes an L1 signal 112 having 175.42 MHz frequency=(1575.42−1400) MHz which is bandpass filtered by the BANDPASS FILTER 114 having a bandwidth BW=30 MHz. This operation results in a L1 signal 115 having a BW=30 MHz. The AMPLIFIER 116 amplifies the L1 signal 115 and outputs the amplified L1 signal 118.

FIG. 6 describes an IF (intermediate frequency) PROCESSOR 30 of FIG. 1 which has as input signals the L1 (175.42 MHz) signal 118 outputted by the DOWNCONVERTER 110. (See FIG. 5). The IF PROCESSOR also uses the 2nd LO2 signal 102 and the SCLK signal 100 outputted by the FREQUENCY SYNTHESIZER 80 (see FIG. 4) as its timing signals. The POWERSPLITTER 120 splits the L1 signal into two L1 signals. The inphase (I) version 102 of the nd LO2 signal and generated by a 122 block 90° the quadrature (Q) version 124 of the 2nd LO2 signal (175 MHz) are multiplied by the L1 signal in the MULTIPLIERs 126, and 128 to produce the inphase version IL1 (130) and the quadrature version QL1 (132) of the L1 signal at frequency 420 KHZ=175.42 MHz−175 MHz and at 25 MHz sampling rate.

The IL1 signal 130 is lowpass filtered by a LOWPASS FILTER 134 with the BW=12.5 MHz which satisfies the Nyquist Theorem for 25 MHz sampling rate of the IL1 signal, amplified by an AMPLIFIER 138, converted by an A/D CONVERTER 142, and sampled by clocking the input signal 143 through a 146 FLIP-FLOP 1 at sampling clock (SCLK) rate. The A/D conversion can be performed by using an L-bit quantization operation, L being an integer greater or equal to 1. If L=1, the 1-bit quantization is performed and the output signal IL1 (150) contains only the Most Significant Bit (MSB) of the IL1 signal at 420 KHz.

The QL1 signal (132) is similarly processed by a LOWPASS FILTER 136, an AMPLIFIER 140, an A/D CONVERTER 144, and a FLIP-FLOP 2 (148), wherein the output (152) signal is a digitized QL1 signal at 420 KHZ. Thus, the digital output of IF PROCESSOR block are the sampled versions of the L1 signal with carrier frequency of 420 KHZ. The samples include all visible satellite carrier and codes at the respective frequencies.

A DIGITAL CHANNEL PROCESSOR (32) given in FIG. 7 includes two main blocks: an L1 TRACKER (154) and a SAMPLED W CODE EXTRACTOR (156) which are controlled by the MICROPROCESSOR SYSTEM (34). The DIGITAL CHANNEL PROCESSOR (32) is designed to track the L1 C/A code and further provides a means for extracting and storing samples of the unknown W code. The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The L1 C/A TRACKER (154) takes as its inputs the digital signals IL1 (150), and QL1 (152) outputted by the IF PROCESSOR (30) as shown in FIG. 6. The IL1 and QL1 signals represent inphase and quadrature versions of the GPS L1 frequency spectrum, including L1 C/A and Y codes.

The SAMPLED W CODE EXTRACTOR (156) processes the signals Ys (158), P (160), and X1A (162) from the L1 C/A TRACKER and forms samples of the unknown W code which are subsequently logged by the MICROPROCESSOR SYSTEM 34. The timing clocking signal SCLK (100) is supplied by the FREQUENCY SYNTHESIZER 80 as depicted in FIG. 4. A single DIGITAL CHANNEL PROCESSOR is capable of extracting sampled W code on a single GPS satellite.

The L1 C/A TRACKER (154) is depicted in FIG. 8. The GPS RECEIVER can track the received GPS signals having very low signal levels by using a Delay-Lock Loop. The essential element of the Delay-Lock Loop is the block (188) CORRELATORS, wherein the received code is multiplied by a reference code having a time offset less than T; T being a code chip interval. The code correlation is performed at 3 time points (E-early, P-punctual and L-late) on the autocorrelation function graph. The E, P, and L samples of the autocorrelation function are integrated in the block (188) CORRELATORs. The CORRELATORs output provides an indication of the sign of the delay error of a tracking reference signal. Therefore, in the Delay-Lock Loop the outputs of the E and L correlation are subtracted to form a correlation signal. This correlation signal in the DIGITAL CHANNEL PROCESSOR becomes a number signal which is used to drive a numerically-controlled oscillator (190) CODE NCO or clock. This clock CODE NCO in turn drives the CODE GENERATOR (186) in such a manner that if the clock is lagging in phase, the correction signal drives the clock faster and the reference code speeds up and runs in coincidence with the received signal and visa versa. Thus, the reference code is tracking the received code. The EPOCH time signal (187) measures the timing of the received signal. The RECEIVER also contains a punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than ±1 code chip error. Initially the user's RECEIVER may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips. If acquisition of the C/A code of one satellite can be accomplished within acquisition time T, then the total acquisition time for 4 satellites can be less than or equal to 4T if a single RECEIVER is time sequenced over the four satellites.

Referring again to FIG. 8, the function of the L1 C/A TRACKER is to track L1 C/A code and provide signals X1A (162), P (160), and Ys (158) for use by the SAMPLED W CODE EXTRACTOR block 156 of FIG. 7. Incoming signals IL1 (150) and QL1 (152) are first frequency translated from 420 KHz+Doppler to 0 KHz. This function is performed by the CARRIER MIXER (180) and by the CARRIER NCO block (182). When the L1 C/A TRACKER is carrier locked to L1 C/A code, the output I of the CARRIER MIXER contains the baseband C/A code power. When the carrier tracking loop is closed (see discussion above), the C/A code power is minimized in the Q output of the CARRIER MIXER. The CODE MIXER 1 (184) mixes the incoming I signal (181) with a locally generated replica of the C/A code (185) for the particular satellite being observed. The CORRELATORS (188) form a summation of the CODE MIXER 1 output over an integer number of C/A code EPOCH 187. The MICROPROCESSOR SYSTEM (34) reads the CORRELATORS output and uses this information to form code and carrier feedback loops via the CODE NCO (190) and CARRIER NCO (182) blocks respectively.

The satellite speed is not constant even if the RECEIVER is not movable. The RECEIVER's quartz clock is not precise enough and keeps changing all the time. Those are the two main reasons why the frequency of the received satellite signal keeps changing. To accommodate for those changes the MICROPROCESSOR keeps the carrier tracking loop locked by continuously adjusting the frequency word inputted to the CARRIER NCO (182) thus affecting the output.

The CODE GENERATOR 186 is the standard shift register sequences described in the "Interface Control Document" of Rockwell International Corporation entitled "Navstar GPS Space Segment/Navigation User Interfaces", dated Sep. 26, 1984, as revised Dec. 19, 1986, hereinafter referred to as the "ICD-GPS-200". The CODE GENERATOR produces four signals: C/A (185), EPOCH (187), X1A (162), and P (160). The C/A code is used to facilitate L1 C/A code tracking. The EPOCH is related to the repetition rate of the C/A code i.e. every one millisecond.

The P code is the precision code each satellite transmits when not encrypted. A standard process known as 'handover' is commonly used when satellites are not encrypted to obtain information from C/A code tracking (via its dam message and time of arrival) to allow tracking of the L1 P code. The 'handover' process involves locking to the satellite of interest on C/A code and using timing information in the data message to compute exactly which millisecond of the GPS week the satellite being received was in when it first transmitted the signal. From this timing information the P code register states are computed at a known time of the week and the P code generator is started at this known time of the week with these states. As a result, the locally generated P code will be virtually aligned with the satellite transmitted P code. Therefore, the correlation and demodulation processes can be performed on the L1 P code.

The L1 C/A and P(Y) codes are transmitted on the same frequency (1575.42 MHz), but in quadrature, that is the carriers are out of phase by 90°. Therefore, when the L1 C/A TRACKER is carrier locked, the C/A code power is observed in the I output (181) of the CARRIER MIXER, and the P(Y) code power is observed in the Q output (183) of the CARRIER MIXER. Thus, by tracking L1 C/A code, it is possible to generate a baseband version of a satellite's P(Y) code. The Y code is made up of a secret W code and the satellite's unencrypted P code (See Keegan patent cited in the background section). Hence, if P code is removed from the incoming Y code, W code can be observed.

The output Ys signal (158) represents a baseband estimate of the Y code of the satellite the L1 C/A TRACKER is tracking on C/A code. The X1A code (162) is a standard P code generator timing signal. It refers to a particular state of the X1A register (one of the 12 bit registers making up the P code generator) and repeats itself every 400 μsecs. There are 2.5 X1A epochs for every C/A EPOCH. Therefore, the X1A epoch and C/A EPOCH are synchronized every other C/A EPOCH.

Even if the L1 C/A TRACKER is not tracking L1 P code, the MICROPROCESSOR SYSTEM (34) sets up the P code (160) and X1A (162) outputs of the CODE GENERATOR (186) to be aligned with the received satellite's P(Y) code. The C/A and P code generators are synchronized on the satellite. Thus, tracking L1 C/A code allows synchronization to be maintained to the L1 P code.

The L1 Y code is used in the observations because it transmits 3 dB more power than L2 Y code. Additionally, the L1 Y code does not have a significant ionospheric delay with respect to L1 C/A code, wherein the L2 Y code does have a significant ionospheric delay with respect to the L2 C/A code that creates a time delay uncertainty in lining up locally generated P code with the incoming Y code.

FIG. 9 illustrates a SAMPLED W CODE EXTRACTOR 156 of FIG. 7. The CODE MIXER 2 (200) mixes the locally generated by L1 C/A TRACKER P code (160) with the samples of the estimated L1 Y code Ys (158) also generated by L1 C/A TRACKER. The output of the CODE MIXER 2 Ws (201) represents the incoming satellite Y code with the P code removed, i.e. it represents samples of the estimated L1 W code in a low pass bandwidth of +/− 12.5 MHz. The sample rate is given by 25 MHz SCLK clock signal (100). The estimated W code samples are fed into the n-BIT SHIFT REGISTER (202) at a rate SCLK. Thus, at any moment in time last n samples of estimated W code are stored in the n BIT SHIFT REGISTER. Every n-th sample clock SCLK the output of the n BIT SHIFT REGISTER is read into the DATA MEMORY (206). The DATA MEMORY is addressed via the ADDRESSING COUNTER (208) which increments the memory address value (m bits) every n-th SCLK edge. The operation of logging the samples of estimated W code into the DATA MEMORY is controlled by the MICROPROCESSOR SYSTEM (34) via the X1A signal (162).

FIG. 10 depicts the initialization timing characteristics (210) of the logging process for the SAMPLED W CODE EXTRACTOR. The MICROPROCESSOR SYSTEM selects which X1A epoch it wishes to initialize on by asserting the CONTROL signal (see 164 of FIG. 9 and 212 of FIG. 10) to the input of the 2-INPUT AND GATE (204 of FIG. 9) in the period before the desired X1A signal (214 of FIG. 10). The RESET signal 205 generated by the 2-INPUT AND GATE (204 of FIG. 9) resets the DIVIDE BY n block (210 of FIG. 9), ADDRESSING COUNTER and n-BIT SHIFT REGISTER in such a way that their subsequent operations are synchronous with the X1A signal.

After the DATA MEMORY (206) is full of samples or when the MICROPROCESSOR SYSTEM has stopped the data logging process (via CONTROL signal to the DATA MEMORY), the DATA MEMORY is read by the MICROPROCESSOR SYSTEM and the data is transferred to the W SAMPLES STORAGE (36 of FIG. 1). The W SAMPLES STORAGE is a permanent storage device (e.g. computer hard disk) where the logged W code samples may be analyzed using a range of possible analysis algorithms.

FIG. 11 is an illustration of the logging process for sampled W code bits. The first step (222) is to select a satellite-vehicle (SV) to be observed. The selected SV includes the satellite being potentially visible to the PARABOLIC DISH ANTENNA. The azimuth and elevation of the selected SV is generally known to a GPS receiver in the form of orbit parameters. Therefore, the next step (224) is to steer the PARABOLIC DISH ANTENNA to the correct azimuth and elevation of the selected SV.

Once the PARABOLIC DISH ANTENNA is steered to the correct azimuth and elevation of the selected SV, the L1 C/A TRACKER is locked onto the L1 C/A code of the selected SV (step 226). The timing information is extracted from the SV's data message and from the time mark of the C/A locked position in time. This information enables to set up the CODE GENERATOR with the P and X1A signals synchronized with the observation of the SV (step 228).

The sample clock SCLK is equal to 25 MHz, and the P(Y) frequency observed from the SV is equal to 10.23 MHz +/− observed code Doppler. By altering the ADJUSTABLE FREQUENCY SYNTHESIZER the Doppler frequency shift can be compensated for. (step 230). Therefore, the SCLK and P(Y) frequency are synchronized at their respective frequencies. Hence, an observed X1A period which is exactly 4029 P(Y) clocks, is also exactly 10000 SCLK.

With P and X1A signals synchronized to the SV, the estimated L1 W code signal, Ws is an unknown L1 W code from the selected SV. The SAMPLED W CODE EXTRACTOR can be initialized for the next X1A signal at the required preselected observation time. (Step 232). After the initialization is completed, the sampled W code estimates can be loaded into the DATA MEMORY. After K X1A periods, K being an integer, or when the DATA MEMORY is full, the data logging to the DATA MEMORY is stopped (step 234). The logged sampled W code estimates can be transferred from the DATA MEMORY to the W SAMPLES STORAGE by the MICROPROCESSOR SYSTEM (step 236) and available for analysis.

FIG. 12 is a sample of the frequency spectrum observed at the output of the PARABOLIC DISH ANTENNA and the FILTER/LNA blocks. The C/A and P(Y) spectrum are observed overlapping on the frequency spectrum. The specifications given in ICD-GPS-200 for relative power transmission indicates that P(Y) code is transmitted with 3 dB less total power than C/A code. This observation indicates that the signal-to noise ratio (SNR) for the W code in the W code bandwidth (500 kHz) is the observed C/A code SNR plus 3 dB (because the W code has approximately half of the C/A code chipping rate) minus 2 dB (because P(Y) code is observed to be (−2 nB) with respect to the C/A code). This results in the W code having the SNR to be approximately (+14 dB) in respect to the noise floor given by the bottom of graph of FIG. 12. The typical GPS receiving antenna has a gain pattern of approximately 3 dB, resulting in a negative SNR in the W code bandwidth, and thus rendering detailed W code structure impossible to observe. The use of a high gain parabolic antenna has resulted in a positive SNR in the W code bandwidth making the fine W code structure observable. FIG. 12 also indicates the presence of an interfering signal entering the parabolic dish antenna. This interfering signal does not affect the results of the W code fine structure observation because the interfering signal is shifted in frequency in respect to the C/A code.

FIG. 13 is an illustration of sampled W code estimates logged using the SAMPLED W CODE EXTRACTOR and the W SAMPLES STORAGE. These results were analyzed using a power analysis technique which is described as follows.

This technique assumes that the W code rate (number of P(Y) clocks per W code bit) is given by an integer j. Assuming synchronism to a W code bit edge, the power in that W code bit is given by the following equation:

$$T_{POj} = (\sum_{y=1}^{j*f} S_y)^2 \quad (*);$$

wherein:

$T_{POj}$ is the total power output assuming a W code period of j P(Y) clocks;

$S_y$ is the y-th sampled W code estimate (at a rate of SCLK);

f is the frequency factor between the SCLK and the P(Y) clock equal to (25 MHz/10.23 MHz);

j*f is a number of samples at a rate of SCLK in a W code bit of period jP(Y) clocks.

This calculation is performed and summed across many W code bits at the rate of jP(Y) clocks. The resulting summations $\Sigma T_{POj}$ are made for different values of j over a single X1A period and over multiple X1A periods.

The above described technique yielded the timing structure of the observed W code that is described in FIG. 14. The W code is largely made up of a period of 22 P(Y) clocks synchronized to the X1A epoch. This timing structure of W code is observed across single and multiple X1A periods. If other periods are present, they are present only for short periods of time and perhaps change rapidly (every X1A period).

The dominant W code period of 22 P(Y) clocks is observed on all satellites. The W code frequency spectrum resulting from these observations is given in FIG. 15. This represents a sin x over x curve with null points at the dominant W code clocking rate. However, it is possible that the fundamental clocking rate of the W code generator is 22 P(Y) clocks plus a small unknown period τ. Keeping the unknown period τ very short limits the energy of the W code associated with this period τ. This allows to deny a potential observer the detailed knowledge of the W code spectrum. Therefore, the information derived from the described above observations does not provide the ability to predict the future timing of the W code accurately enough to implement the effective anti-spoofing device.

However, the further improvements of the above described technique (like utilizing a higher gain antenna to facilitate the observation of W code precise timing characteristics) can allow to approximate the W code more precisely. In combination with more precise analysis techniques (including Fourier Transformation, and narrowband filtering and edge sharpening of the logged W code sample estimates) these further improvements may provide more details as to the underlying W code.

If the W code generator is of a linear shift register type, than the standard decryption techniques could be used to compute the underlying bit sequence even with substantial bit errors. (See "Algebraic Coding Theory" by Berlekamp, published by Aegean Park Press in April 1988 and "Shift Register Sequences" by S. W. Golomb, published by Aegean Park Press in 1982).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for observing unknown codes on Satellite Positioning System, said apparatus comprising:

a RECEIVING MEANS for receiving a known C/A code modulated on L1 carrier frequency, for receiving an unknown Y code modulated on L1 carrier frequency signal, wherein a received L1 signal contains propagation noise; and wherein said Y code comprises a known P code and an unknown W code;

a MICROPROCESSOR SYSTEM connected to said RECEIVING MEANS for controlling said apparatus using a CONTROL signal;

a W SAMPLES STORAGE connected to said MICROPROCESSOR SYSTEM for permanently storing logged W code samples; and at least one DIGITAL CHANNEL PROCESSING MEANS for:

(1) locally generating replica of said C/A code modulated on L1 carrier frequency signal;

(2) locally generating replica of said P code modulated on L1 carrier frequency signal, wherein said locally generated replica of L1 signal does not contain propagation noise;

(3) extracting an estimate of said Y code from said L1 signal, wherein said estimate signal contains propagation noise;

(4) correlating a locally generated replica of C/A code with a received L1 code for obtaining code and carrier lock to the L1 C/A code signal;

(5) removing said P code from said locally extracted estimate of said L1Y code to obtain a locally extracted estimate of said L1 W code;

(6) logging said L1 W-code estimates in a DATA MEMORY, at a time mark controlled by said MICROPROCESSOR; and (7) transferring data logged in said DATA MEMORY to a W SAMPLES STORAGE for further analysis.

2. The system of claim 1, wherein said RECEIVING MEANS further comprises:

a PARABOLIC DISH ANTENNA MEANS for receiving said L1 satellite signal;

a FILTER/LNA MEANS conductively connected to said PARABOLIC ANTENNA MEANS for performing filtering and low noise amplification of said L1 signal, wherein said FILTER/LNA determines the signal/noise ratio of the received L1 signal L1;

a DOWNCONVERTER MEANS conductively connected to said FILTER LNA MEANS for mixing and converting said L1 signal; and an IF PROCESSOR MEANS conductively connected to said DOWNCONVERTER MEANS for transforming said converted L1 signal into digitally sampled quadrature versions (IL1, QL1) of L1 signal.

3. The system of claim 2 further comprising a FREQUENCY SYNTHESIZER; an ADJUSTABLE FREQUENCY SYNTHESIZER MEANS conductively connected to said FREQUENCY SYNTHESIZER, conductively connected to said IF PROCESSOR MEANS, conductively connected to said DOWNCONVERTER MEANS, and conductively connected to at least one said DIGITAL CHANNEL PROCESSING MEANS, wherein said ADJUSTABLE FREQUENCY SYNTHESIZER MEANS generates several timing signals.

4. The system of claim 2, wherein said FILTER/LNA MEANS further comprises:

a BANDPASS FILTER MEANS connected to said PARABOLIC ANTENNA for filtering said L1 signal; and a LOW NOISE AMPLIFIER (LNA) connected to said BANDPASS FILTER MEANS for amplifying said filtered L1 signal.

5. The system of claim 3, wherein said ADJUSTABLE FREQUENCY SYNTHESIZER further includes:

a FREQUENCY SYNTHESIZER block being controlled by a CONTROL signal generated by a MICROPROCESSOR SYSTEM; and a DIVIDE BY 2 block coupled to said FREQUENCY SYNTHESIZER block for dividing by 2 the frequency of the signal generated by said FREQUENCY SYNTHESIZER block; wherein said ADJUSTABLE FREQUENCY SYNTHESIZER generates a 5 MHz signal.

6. The system of claim 3, wherein said FREQUENCY SYNTHESIZER MEANS further comprises:

a PHASE DETECTOR MEANS for comparing phases of two signals, first said signal being an output signal from said MASTER OSCILLATOR MEANS, second said signal being generated by said FREQUENCY SYNTHESIZER MEANS local reference signal, wherein minimum voltage output signal from said PHASE DETECTOR MEANS represents maximum phase alignment of said two signals;

a LOOP FILTER MEANS connected to said PHASE DETECTOR MEANS for filtering out high frequency voltage noise, wherein an output LOOP FILTER MEANS voltage signal includes a low frequency voltage noise;

a VOLTAGE CONTROLLED OSCILLATOR (VCO) MEANS connected to said LOOP FILTER MEANS, wherein a voltage signal at the input of said VCO causes frequency change in said VCO output signal, and wherein said VCO nominal output signal is locked to said reference signal; and wherein said VCO nominal output signal is used as 1st local oscillator (LO1) signal;

a first DIVIDER MEANS connected to said VCO to divide said VCO output signal to obtain 2nd local oscillator (LO2) signal; and a second DIVIDER MEANS connected to said first DIVIDER MEANS to divide said 2nd LO2 signal to obtain sampling clock (SCLK).

7. The system of claim 3, wherein said FREQUENCY SYNTHESIZER MEANS further comprises:

a "Divide by 5" block;

a PHASE DETECTOR MEANS connected to said block "Divide by 5" for comparing 5 MHz input signal from said MASTER OSCILLATOR MEANS with 5 MHZ signal from said "Divide by 5" block, wherein minimum voltage output signal from said PHASE DETECTOR MEANS represents maximum phase alignment of two said 5 MHZ signals;

a LOOP FILTER MEANS connected to said PHASE DETECTOR MEANS for filtering out high frequency voltage noise;

a VOLTAGE CONTROLLED OSCILLATOR (VCO) MEANS connected to said LOOP FILTER MEANS, wherein voltage signal at the input of said VCO causes frequency change in said VCO output signal, and wherein said VCO nominal output 1400 MHz signal is locked to said 5 MHZ reference signal; and wherein said 1400 MHz VCO output signal is used as a 1st local oscillator (LO1);

a "Divide by 8" block connected to said VCO to divide said 1400 MHZ VCO output signal by 8 to obtain a 175 MHZ signal used as a 2nd LO2; and a "Divide by 7" block connected to said "Divide by 8" block to divide said 175 MHZ signal by 7 to obtain a 25 MHZ signal used as a sampling clock (SCLK).

8. The system of claim 2, wherein said DOWNCONVERTER MEANS further comprises:

a MULTIPLIER MEANS for multiplying said L1 signal with said 1st LO1 signal, wherein a mixed signal is produced;

a BANDPASS FILTER MEANS connected to said MULTIPLIER MEANS for filtering said mixed signal; and an AMPLIFIER MEANS connected to said BANDPASS FILTER MEANS for amplifying said filtered signal;

wherein said L1 signal is downconverted from the 1575.42 MHz frequency to a frequency of 175.42 MHz.

9. The system of claim 2, wherein said IF PROCESSOR MEANS further comprises:
- a POWER SPLITTER MEANS connected to said DOWNCONVERTER MEANS and to said FREQUENCY SYNTHESIZER MEANS for power splitting said L1 signal into two signals;
- a first MULTIPLIER MEANS for multiplying said L1 signal with an inphase (I) version of said 2nd LO2 signal to produce an IL1 signal;
- a second MULTIPLIER MEANS for multiplying said L1 signal with a quadrature (Q) version of said 2nd LO2 signal to produce a QL1 signal;
- a first LOWPASS FILTER MEANS connected to said first MULTIPLIER MEANS for filtering said first mixed signal;
- a second LOWPASS FILTER MEANS connected to said second MULTIPLIER MEANS for filtering said second mixed signal;
- a first AMPLIFIER MEANS connected to said first LOWPASS FILTER MEANS for amplifying said IL1 signal;
- a second AMPLIFIER MEANS connected to said second LOWPASS FILTER MEANS for amplifying said QL1 signal;
- a first one-bit analog-to-digital (A/D) CONVERTER MEANS connected to said first AMPLIFIER MEANS for performing 1-bit quantization operation on said IL1 signal;
- a second one-bit analog-to-digital (A/D) CONVERTER MEANS connected to said second AMPLIFIER MEANS for performing 1-bit quantization operation on said QL1 signal;
- a first FLIP-FLOP MEANS (FF1) connected to said first one-bit A/D CONVERTER for sampling said IL1 signal, wherein said sampling operation is performed by clocking said IL1 signal through said FF1 at sampling clock (SCLK) rate; and
- a second FLIP-FLOP MEANS (FF2) connected to said second one-bit A/D CONVERTER for sampling said QL1 signal, wherein said sampling operation is performed by clocking said QL1 signal through said FF2 at sampling clock (SCLK) rate.

10. The system of claim 1, wherein each said DIGITAL CHANNEL PROCESSING MEANS further comprises:
- an L1 C/A TRACKER MEANS for tracking L1 C/A code;
- a SAMPLED W CODE EXTRACTOR connected to said L1 C/A TRACKER MEANS for extracting and storing samples of the unknown W code from a single satellite; and
- a MICROPROCESSOR MEANS system connected to said L1 TRACKER MEANS and to said SAMPLED W CODE EXTRACTOR;

wherein said L1 C/A TRACKER MEANS is fed by digitized inphase IL1 and quadrature QL1 of L1 signal outputted by said IF PROCESSOR MEANS; and wherein said SAMPLED W CODE EXTRACTOR is fed by Ys, P, and X1A signals outputted by said L1 C/A TRACKER MEANS; and wherein said SAMPLED W CODE EXTRACTOR processes the signals Ys, P, and X1A to form samples of the unknown W code which are subsequently logged by said MICROPROCESSOR SYSTEM; and wherein said L1 C/A TRACKER MEANS and said SAMPLED W CODE EXTRACTOR are synchronously clocked by said SCLK signal outputted by said FREQUENCY SYNTHESIZER MEANS; and wherein said MICROPROCESSOR MEANS system is fed by output signals from said L1 C/A TRACKER MEANS and from said SAMPLED W CODE EXTRACTOR; and wherein said L1 C/A TRACKER MEANS and said SAMPLED W CODE EXTRACTOR are fed by a CONTROL signal from said MICROPROCESSOR MEANS.

11. The system of claim 10, wherein said L1 C/A TRACKER MEANS further comprises:
- a carrier numerically controlled oscillator (CARRIER NCO MEANS);
- a CARRIER MIXER MEANS connected to said CARRIER NCO MEANS for multiplying outputted by said IF PROCESSOR MEANS digitized inphase IL1 and QL1 signals having carrier frequency with outputted by said CARRIER NCO MEANS inphase and quadrature components of digital carrier; wherein said CARRIER MIXER MEANS outputs inphase IL1 and quadrature QL1 signals having zero carrier frequency;
- a CODE MIXER 1 MEANS connected to said CARRIER MIXER MEANS for code correlating said CARRIER MIXER MEANS output signals with a locally generated replica of C/A code; wherein when said L1 TRACKER MEANS's carrier tracking loop is closed via said CARRIER NCO MEANS the CARRIER MIXER's input to said CODE MIXER 1 MEANS represents the satellite signal L1 C/A code; and wherein said CODE MIXER 1 MEANS performs said code correlation at 3 time points (early, punctual and late) on the autocorrelation function graph creating an early, a punctual and a late sample of the autocorrelation function;
- a block CORRELATORS MEANS connected to said CODE MIXER 1 MEANS for integrating said early, punctual and late samples of said autocorrelation function over an integer number of EPOCH signals; wherein said CORRELATORS MEANS output signal is fed to said MICROPROCESSOR MEANS system at a rate of L1 C/A code EPOCH, and wherein said MICROPROCESSOR MEANS uses said CORRELATORS MEANS output signal to develop feedback signals for the L1 carrier tracking loop and for the L1 code tracking loop;
- a CODE GENERATOR MEANS connected to said CORRELATORS block for providing a locally generated replica of C/A code, a locally generated replica of P code, an EPOCH signal, and an X1A signal; and
- a code numerically controlled oscillator (CODE NCO MEANS) connected to said block CORRELATORS MEANS and connected to said CODE GENERATOR MEANS for driving said CODE GENERATOR MEANS;

wherein when said L1 C/A TRACKER is carrier locked to the tracked satellite the satellite's C/A code power is observed in the I output of said CARRIER MIXER and the satellite's P(Y) code power is observed in the Q output of said CARRIER MIXER; and wherein by tracking L1 C/A code a baseband version of the satellite's P(Y) code is generated; and wherein the L1 C/A TRACKER's output signal Ys represents a baseband estimate of the Y code of the tracked satellite; and wherein the X1A output of said CODE GENERATOR is a standard P code generator timing signal that refers to a particular state of the X1A register.

12. The system of claim 10, said SAMPLED W CODE EXTRACTOR further comprising:

a CODE MIXER 2 MEANS for mixing P code with Ys code, wherein P code and Ys code are generated by said L1 C/A TRACKER; and wherein said CODE MIXER 2 generates Ws code representing the incoming satellite Y code with P code removed;

an n-BIT SHIFT REGISTER coupled to said CODE MIXER 2 for maintaining the last n sampled bits of the Ws signal;

a DATA MEMORY block coupled with said n-BIT SHIFT REGISTER, wherein every n-th clock signal SCLK the output of said n-BIT SHIFT REGISTER is read into said DATA MEMORY;

an ADDRESSING COUNTER coupled to said DATA MEMORY block and addressing said DATA MEMORY block, wherein said ADDRESSING COUNTER increments the memory address value every n-th clock signal SCLK;

a 2-INPUT AND GATE gating the CONTROL and X1A signals for initiating the sample data collection process by said DATA MEMORY block at a known time in the GPS week and for synchronizing the logging process and for allowing repeated controlled observation of the encrypted signals, said 2-INPUT AND GATE generating a RESET signal;

a DIVIDE BY n block connected to said L1 C/A TRACKER for generating a second clock signal by dividing the clock SCLK signal by n, wherein said DIVIDE BY n block is reset by said RESET signal, and wherein said second clock signal clocks said ADDRESSING COUNTER; and wherein when said DATA MEMORY is filled said DATA MEMORY is read by said MICROPROCESSOR SYSTEM and transferred to said permanent storage W SAMPLES STORAGE.

13. A method for observing unknown codes on SPS; said method employing a system comprising a RECEIVING MEANS, at least one DIGITAL CHANNEL PROCESSING MEANS, and a W SAMPLES STORAGE; said method comprising the steps of:

providing said RECEIVING MEANS, said W SAMPLES STORAGE, and at least one said DIGITAL CHANNEL PROCESSING MEANS;

receiving a known L1 C/A code modulated on L1 carrier frequency, and an unknown Y code modulated on L1 carrier frequency signal by said RECEIVING MEANS; wherein a received L1 signal contains propagation noise; and wherein said Y code comprises a known P code and an unknown W code;

generating a local replica of said C/A code and a local replica of said P code modulated on L1 carrier frequency signal by each said DIGITAL CHANNEL PROCESSING MEANS;

extracting an estimate of said Y code from said L1 signal by each said DIGITAL CHANNEL PROCESSING MEANS;

correlating a locally generated replica of C/A code with the received L1 code for obtaining code and carrier lock to the L1 C/A code signal;

removing said P code from said locally extracted estimate of said L1Y code by each said DIGITAL CHANNEL PROCESSOR to obtain a locally extracted estimate of said L1 W code;

logging said L1 W code estimate in a DATA MEMORY at a time mark controlled by a MICROPROCESSOR; and transferring a logged sampled W code from said DATA MEMORY to said W SAMPLES STORAGE for further processing.

14. The method of claim 13, said RECEIVING MEANS further comprising a FILTER/LNA MEANS, a DOWNCONVERTER MEANS, an IF PROCESSOR MEANS, and a FREQUENCY SYNTHESIZER MEANS; wherein said step of receiving L1 satellite signal further comprises the steps of:

receiving said L1 satellite signal by said PARABOLIC ANTENNA MEANS;

performing filtering and low noise amplification of said L1 signal by said FILTER/LNA MEANS, wherein said FILTER/LNA MEANS determines the signal/noise ratio of the received signal L1;

converting said L1 signal by said DOWNCONVERTER MEANS;

transforming said converted L1 signal into digitally sampled quadrature versions of L1 signal (IL1, QL1) by said IF PROCESSOR MEANS; and generating several timing signals by said FREQUENCY SYNTHESIZER MEANS.

15. The method of claim 13, each said DIGITAL CHANNEL PROCESSING MEANS further comprising a MICROPROCESSOR MEANS system; said method further comprising the steps of:

tracking L1 C/A code by said L1 C/A TRACKER MEANS;

feeding said SAMPLED W CODE EXTRACTOR MEANS by Ys, P code, and X1A signals generated by said L1 C/A TRACKER MEANS;

extracting and storing samples of the unknown W code from said Ys, P, and X1A signals by said SAMPLED W CODE EXTRACTOR MEANS; and feeding said W SAMPLES STORAGE by the samples of the unknown W code under control of said MICROPROCESSOR MEANS system.

16. The method of claim 15, said L1 C/A TRACKER MEANS further comprising a (CARRIER NCO MEANS), a CARRIER MIXER MEANS, a CODE MIXER 1 MEANS, a block CORRELATORS MEANS, a CODE GENERATOR MEANS, and a code numerically controlled oscillator (CODE NCO MEANS); said method further comprising the steps of:

multiplying by said CARRIER MIXER MEANS outputted by said IF PROCESSOR MEANS digitized inphase IL1 and QL1 signals having carrier frequency with outputted by said CARRIER NCO MEANS 1 inphase and quadrature components of digital carrier; wherein said CARRIER MIXER MEANS outputs inphase IL1 and quadrature QL1 signals having zero carrier frequency;

providing a locally generated replica of C/A code, a locally generated replica of P code, an EPOCH signal, and an X1A signal by said CODE GENERATOR MEANS;

driving said CODE GENERATOR MEANS by said CODE NCO MEANS;

correlating by said CODE MIXER 1 MEANS the inphase IL1 and the quadrature QL1 signals having zero carrier frequency with said locally generated replica of C/A code; and integrating by the block CORRELATORS MEANS the early, punctual and late samples of the autocorrelation function generated by said CODE MIXER 2 MEANS over an integer number of said EPOCH signals;

wherein when said L1 C/A TRACKER is carrier locked to the tracked satellite the satellite's C/A code power is observed in the I output of said CARRIER MIXER and the satellite's P(Y) code power is observed in the Q output of said CARRIER MIXER; and wherein by tracking L1 C/A code a baseband version of the satellite's P(Y) code is generated; and wherein the L1 C/A TRACKER's output signal Ys represents a baseband estimate of the Y code of the tracked satellite; and wherein the X1A output of said CODE GENERATOR is a standard P code generator timing signal that refers to a particular state of the X1A register.

17. The method of claim 15, said SAMPLED W CODE EXTRACTOR further comprising a CODE MIXER 2 MEANS, an n-BIT SHIFT REGISTER, a DATA MEMORY block, an ADDRESSING COUNTER, a 2-INPUT AND GATE, and a DIVIDE BY n block; said method comprising the steps of:

mixing by said CODE MIXER 2 MEANS P code with Ys code;

generating a Ws code representing the incoming satellite Y code with P code removed by said CODE MIXER 2;

maintaining the last n sampled bits of the Ws signal by said n-BIT SHIFT REGISTER;

reading into said DATA MEMORY block every n-th clock signal SCLK the output of said n-BIT SHIFT REGISTER; addressing by said ADDRESSING COUNTER said DATA MEMORY block, wherein said ADDRESSING COUNTER increments the memory address value every n-th clock signal SCLK;

initiating the sample data collection process by said DATA MEMORY block at a known time in the GPS week, synchronizing the logging process, and allowing repeated controlled observation of the encrypted signals by said 2-INPUT AND GATE, wherein said 2-INPUT AND GATE block gates the CONTROL and X1A signals and generates a RESET signal;

generating a second clock signal by dividing the clock SCLK signal by n by said DIVIDE BY n block; wherein said DIVIDE BY n block is reset by said RESET signal, and wherein said second clock signal clocks said ADDRESSING COUNTER; and wherein when said DATA MEMORY is full of samples said DATA MEMORY is read by said MICROPROCESSOR SYSTEM and transferred to said permanent storage W SAMPLES STORAGE.

18. A method for logging the sampled W code generated by the Satellite Positioning System (SPS) comprising the steps of:

selecting a satellite-vehicle (SV) to be observed;

observing the selected SV by steering a PARABOLIC DISH ANTENNA to azimuth and elevation of said SV;

searching by a L1 C/A TRACKER an L1 C/A code signal generated by said SV;

locking to said L1 C/A code by closing the code and carrier tracking loops by said L1 C/A TRACKER;

synchronizing P and X1A signals generated by a CODE GENERATOR with said SV satellite L1 C/A signal;

aligning an ADJUSTABLE FREQUENCY OSCILLATOR to said SV;

extracting unknown W code signals from said L1 C/A signals by a W CODE EXTRACTOR;

logging sampled W code signals by a DATA MEMORY block;

transferring the logged sampled W code from said DATA MEMORY to a W SAMPLE STORAGE by a MICROPROCESSOR system; and stopping the logging process when said W SAMPLE STORAGE is filled.

* * * * *